United States Patent
Anderson et al.

(10) Patent No.: US 8,073,705 B2
(45) Date of Patent: *Dec. 6, 2011

(54) SYSTEMS AND METHODS FOR THE PREVENTION OF EXTENDED UTILITY THEFT

(75) Inventors: Michael Anderson, Atlanta, GA (US); Anthony Anderson, Dacula, GA (US); Rob Keith Johnson, Sharpsburg, GA (US); Brian King, Atlanta, GA (US)

(73) Assignee: Blu Trend, LLC, Atlanta, GA (US)

( * ) Notice: Subject to any disclaimer, the term of this patent is extended or adjusted under 35 U.S.C. 154(b) by 220 days.

This patent is subject to a terminal disclaimer.

(21) Appl. No.: 12/401,250

(22) Filed: Mar. 10, 2009

(65) Prior Publication Data

US 2009/0198600 A1    Aug. 6, 2009

Related U.S. Application Data

(63) Continuation-in-part of application No. 12/271,201, filed on Nov. 14, 2008, now Pat. No. 7,957,980, and a continuation of application No. 11/768,739, filed on Jun. 26, 2007, now Pat. No. 7,467,092, and a continuation of application No. 11/747,752, filed on May 11, 2007, now abandoned, and a continuation of application No. 11/670,164, filed on Feb. 1, 2007, now abandoned, and a continuation of application No. 11/404,221, filed on Apr. 14, 2006, now abandoned.

(51) Int. Cl.
*G06Q 10/00* (2006.01)

(52) U.S. Cl. .................................................. 705/1.1

(58) Field of Classification Search ......................... None
See application file for complete search history.

(56) References Cited

U.S. PATENT DOCUMENTS

| | | | |
|---|---|---|---|
| 5,184,119 | A | 2/1993 | Stanbury et al. |
| 5,684,965 | A | 11/1997 | Pickering |
| 6,334,107 | B1 | 12/2001 | Gale et al. |
| 2003/0093289 | A1 | 5/2003 | Thomley et al. |
| 2003/0200107 | A1 | 10/2003 | Allen et al. |
| 2004/0138896 | A1 | 7/2004 | Cheng |
| 2005/0102152 | A1 | 5/2005 | Hodges |
| 2005/0144028 | A1 | 6/2005 | Donahue et al. |
| 2006/0000890 | A1 | 1/2006 | Nakajima |
| 2006/0045105 | A1 | 3/2006 | Dobosz et al. |
| 2006/0074802 | A1 | 4/2006 | Hall et al. |

OTHER PUBLICATIONS

"Beyond billing residents for utilities: growth in technology and the systems that support resident utility billing have opened doors to new opportunities for cost recovery."
Business Services Industry, "National Water & Power Generates $1 Million in Vacant Energy Cost Recovery for Energy Information Services—EIS+—Customers," Business Wire.
CSA Secure White Paper, "You wouldn't be satisfied collecting only 60% of your rent money. So why settle for collecting only 60% of CSA violations?" CSA Secure Team Sep. 10, 2007.

*Primary Examiner* — Jonathan Ouellette
(74) *Attorney, Agent, or Firm* — Sutherland Asbill & Brennan LLP (57) ABSTRACT

Notification systems and methods are provided for identifying utility theft for an entity associated with a premise under a Continuous Service Agreement with at least one utility service provider, where utility service is never turned off such that the entity may legally use utility services while a premise is vacant.

26 Claims, 5 Drawing Sheets

SYSTEMS AND METHODS FOR THE PREVENTION OF EXTENDED UTILITY THEFT

CROSS REFERENCE TO RELATED APPLICATIONS

The present application is a continuation in part of U.S. application Ser. No. 12/271,201 filed Nov. 14, 2008, which is a continuation of U.S. application Ser. No. 11/768,739, filed Jun. 26, 2007, entitled "Systems and Methods for the Prevention of Extended Utility Theft," which issued as U.S. Pat. No. 7,467,092 on Dec. 16, 2008. U.S. Pat. No. 7,467,092 is a continuation of U.S. application Ser. No. 11/747,752, filed May 11, 2007, now abandoned, which is a continuation of U.S. application Ser. No. 11/670,164, filed Feb. 1, 2007, now abandoned, which is a continuation of U.S. application Ser. No. 11/404,221, filed Apr. 14, 2006, now abandoned. The disclosures of each of these applications are incorporated by reference herein in their entirety.

FIELD OF THE INVENTION

The present invention relates to identifying utility theft, and more particularly to systems, methods, and computer program products for identifying unauthorized use of utility service, and providing notifications to property owners and managers when tenants fail to transfer the utility service into their name, or take responsibility for payment of utilities.

BACKGROUND OF THE INVENTION

Millions of multifamily apartment complexes and other rental units exist in the United States. For such units, it is a common practice for the property owner/manager to enter into agreements with the utility companies to keep electricity and/or gas always turned on at the unit, even while the unit is vacant, to eliminate inconveniences and/or the service fees utility companies may charge to turn-on and shut-off service to individual units. Additionally, property owners/managers often need utility services to remain on in vacant units, for example, to perform maintenance and to keep the HVAC system running to prevent un-desirable situations such as frozen pipes in the winter, or the build-up of mold or odor in the summer. To permit always-on or continuous service, agreements between the utility company and the property owner/manager, commonly referred to as Continuous Service Agreements (CSAs), are used to authorize the transfer of payment responsibility from owners to tenants who move-in, or to transfer payment responsibility back to the owner when tenants move-out. In most cases, the tenants of the units are responsible for establishing utility services with local utility companies as required in their lease agreements, which often require that a tenant contact their local utility prior to move-in to sign up for services and to keep that service on for the duration of their lease.

Under CSAs, until a tenant contacts a utility company and establishes service in their name, the owners will typically be responsible for payment of those utility services—even though the tenant still occupies the unit. Also, later when a tenant contacts a utility company with a false move-out date prior to vacating a unit, the owners again will be responsible for payment of those utility services under the CSA. Because the average turnover for tenants in multifamily units is high, the use of a CSA exposes property owners to a significant amount of utility-related expenses when a tenant reports a false move-out or fails to take responsibility for utility charges after move-in. Although this problem applies to many multifamily units, the problem also exists for any leased space where arrangements such as CSAs exists and a non-owner tenant is responsible for utility service charges. Currently, when a multifamily unit tenant fails to apply for a utility service under their name, the property manager or owner will receive the utility bills for the occupied units, and it may take 45 days or longer before the owner becomes aware that the tenant has not established service in their name. The property manager or owner must then go through the tedious and complex task of matching bills for occupied units with tenants, which requires the correct information to permit a property manager to identify the tenants that owe money for utilities. This task of cost recovery based on utility bills is made even more difficult due to unit turnover because utility bills often apply to utility service consumed months earlier, and tenants within a particular unit may have already moved out. Often the situation goes un-noticed for months and results in loss of income for owners and property managers. Furthermore, in the event that tenants call their local utility company and ask for a disconnection or shut off of service under their name before moving out, owners can become prematurely responsible for utility expenses that should be paid by the tenant.

In recent years some multifamily owners have outsourced the identification of utility recovery to third party service companies that match utility bills with tenant data received from property owners and provide multifamily tenants with a recovery bill. This type of service is known as Vacant Cost Recovery (VCR). VCR bills are typically available 45 or more days after the usage service period, and the utility recovery process is generally only available for those tenants who fail to enroll for service at the time of move-in. When tenants report a false move-out date to the utility within 45 days of their actual move-out, the utility bills for units may go un-recovered because the bills are not received until after the tenant has vacated the unit. As such, these utility recovery processes lack the ability to identify potential cost recovery opportunities on the back end or at the time of move out. In addition, standard utility recovery methods report move-in violations approximately 45 days or longer after the violation, putting pressure on multifamily owner's cash flow since utility bills are paid to utility companies before utility recoveries are collected from tenants. Therefore, a system and method is needed to quickly identify utility theft by tenants who are or who will be receiving services for which the owner may incur costs.

SUMMARY OF THE INVENTION

According to example embodiments of the invention, a notification system is provided to identify utility theft for an entity associated with a premise under a Continuous Service Agreement with at least one utility service provider, where utility service is never turned off such that the entity may legally use utility services while a premise is vacant. The notification system includes at least one memory for storing data and computer-executable instructions, at least one computer interface, and at least one processor in communication with the at least one computer interface and configured to access the at least one memory. The processor is further configured to execute the computer-executable instructions to receive tenant data from at least one property management system. The tenant data identifies at least one tenant responsible for utility service and includes at least one of a lease start date, an actual move-in date, or a lease renewal date and at least one of an expected move-out date, an actual move-out date, a lease expiration date, or a notice to vacate date for tenants occupying the premises of the entity. The processor is further configured to execute the computer-executable instructions to receive switching transaction data from one or more switching transaction data sources, where the switching transaction data may include information identifying at least one of the establishment date or termination date of the utility service. The processor may be further configured to execute the computer-executable instructions to compare the switching transaction data to at least one of the lease start date, the actual move-in date, the lease renewal date, the expected move-out date, the lease expiration date, the notice to vacate date, or the actual move-out date to identify the unauthorized use of utility services. The processor may also be configured to execute the computer-executable instructions to provide one or more notifications in response to the detection of unauthorized use of utility service.

According to other example embodiments of the invention, a computer-implemented method is provided for identifying utility theft for an entity associated with a premise under a Continuous Service Agreement with at least one utility service provider, where utility service is never turned off such that the entity may legally use utility services while a premise is vacant. The method includes executing computer-executable instructions by one or more processors configured to execute the computer-executable instructions for receiving tenant data from at least one property management system, where the tenant data identifies at least one tenant responsible for utility service and includes at least one of a lease start date, an actual move-in date, or a lease renewal date and at least one of an expected move-out date, an actual move-out date, a lease expiration date, or a notice to vacate date for tenants occupying the premises of the entity. The method also includes executing computer-executable instructions by one or more processors configured to execute the computer-executable instructions for receiving switching transaction data from one or more switching transaction data sources, where the switching transaction data comprises information identifying at least one of the establishment date or termination date of the utility service. The method further includes executing computer-executable instructions by one or more processors configured to execute the computer-executable instructions for comparing the switching transaction data to at least one of the lease start date, the actual move-in date, the lease renewal date, the expected move-out date, the lease expiration date, the notice to vacate date, or the actual move-out date to identify the unauthorized use of utility services. The method further includes executing computer-executable instructions by one or more processors configured to execute the computer-executable instructions for providing one or more notifications in response to the detection of unauthorized use of utility service.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

Embodiments of the invention will be described more fully hereinafter with reference to the accompanying drawings, in which embodiments of the invention are shown. Reference to block diagrams and flowchart illustrations of systems and methods are shown according to example embodiments of the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

According to example embodiments, the invention may, among other functions, identify tenants, for example, who fail to sign up for and maintain service in their name as required by their lease agreement, or who request service to be switched out of their name prior to vacating a unit. Systems, methods and computer program products of embodiments of the invention may provide notifications or alerts, reports and estimated utility bills to be sent to owners/managers and/or staff as well as tenants that fail to take responsibility for establishment or continuation of utility services, and permit a property owner/manger to send a disconnect request or other notification to a utility service company when such situation exists to prevent further utility theft. According to example embodiments of the invention, the owner/manager can be defined as any entity or person owning or managing a premises, including any of the following: the actual owner or owners, a management company acting on behalf of the owners, the general management staff of the property, or employees of the owner or management company. The premises may include, but is not limited to, an apartment, multi-family unit, condo unit, or commercial office space.

Figure 1:
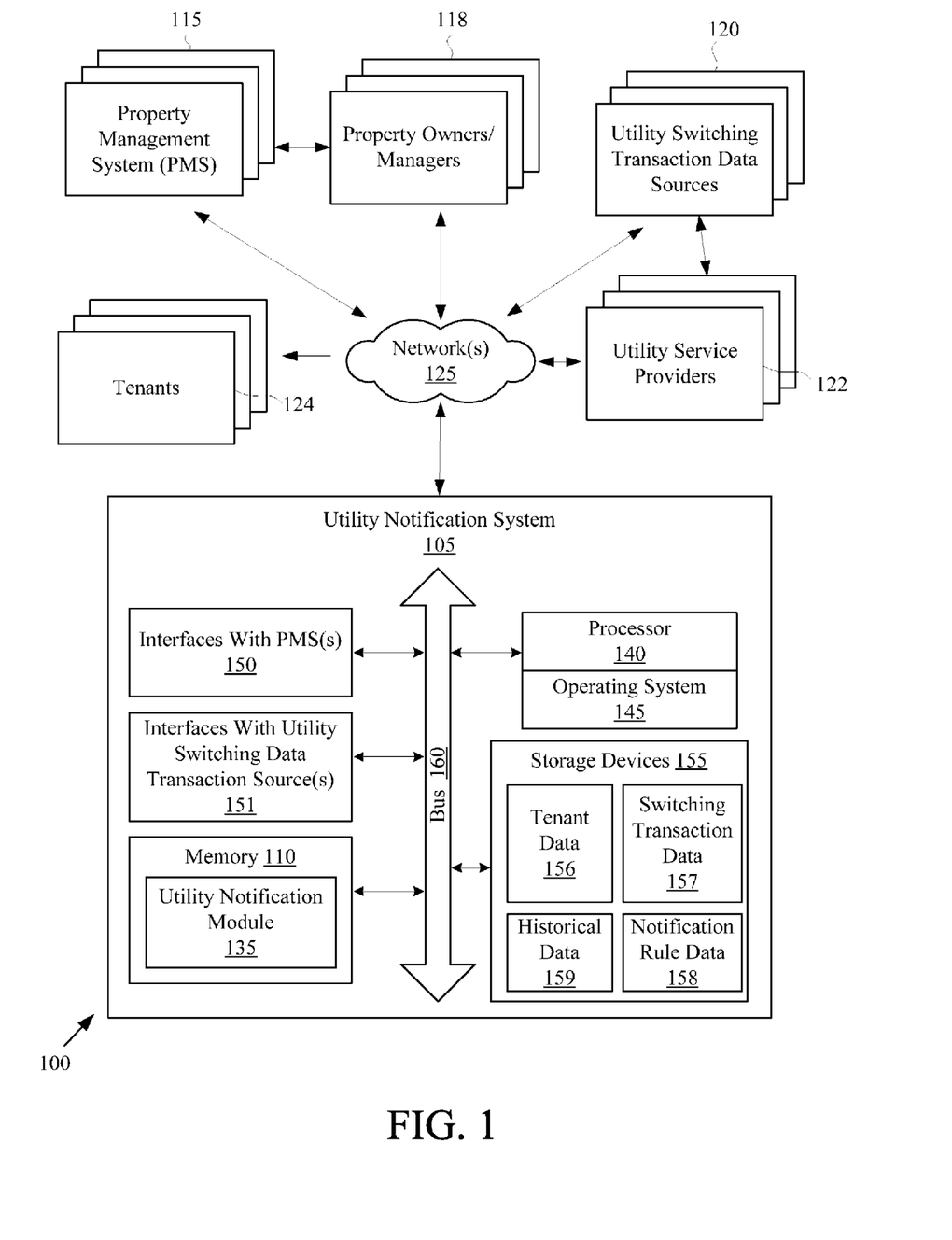
FIG. 1 shows a utility theft elimination system in block diagram form, according to an example embodiment of the invention.

Referring now to FIG. 1, shown is a utility theft elimination system 100 in accordance with an example embodiment of the invention. Generally, the utility theft elimination system 100 may include a utility notification system 105 that may receive tenant data 156 associated with one or more properties. The tenant data 156 may be received via one or more networks 125, such as the Internet, from a property management system (PMS) 115 associated with the properties. According to another example embodiment, the property management system 115 may be integrated with the utility notification system 105, and therefore, the tenant data 156 may be accessed on a shared database by a database query. The tenant data 156 may include information that, for example, identifies an occupant of a unit within the property as well as the period of time in which the occupant will be responsible for the utility service associated with the unit during occupancy. A tenant can enroll for utility service but fail to make a payment to the utility service provider 122. This is referred to as a non-paying tenant 124, which is different from a tenant 124 who fails to enroll for service, or a tenant 124 who transfers service back to the property owner/manager 118 before the end of the lease. In order to facilitate the identification of tenant 124 who fail to enroll for service, the tenant data 156 may include information such as the property owner's 118 name, the property's name, the unit number, the building number, other owner/property/unit identifiers, the tenant name, the tenant billing information, and other tenant identifiers. In addition, the tenant data 156 may include one or more of the tenant's 124 lease start date, the actual move-in date, the lease renewal date, the expected move-out date, the lease expiration date, the notice to vacate date, and the actual move-out. It should be appreciated that the unit can include, but is not limited to, spaces such as multifamily housing units, retail space, and commercial office space.

According to an example embodiment of the invention, the utility notification system 105 may receive switching transaction data 157 for utility services, such as electricity and gas, from one or more utility switching transaction data sources 120 via one or more networks 125. According to an example embodiment of the invention, the utility notification system 105 may also receive switching transaction data 157 for utility services directly from a utility service provider 122. According to example embodiments of the invention, the switching transaction data 157 may include utility enrollment information, service turn or turn off request, service connect or disconnect request, service account establishment information, service termination date information or service account de-activation notice from billing, a Customer Interface System (CIS) or any other systems that contain this information. According to example embodiments of the invention, the switching transaction data 157 may also include utility enrollment dates, service turn or turn off request dates, service connect or disconnect request dates, service account establishment dates, service termination dates, or service account de-activation dates. According to an example embodiment of the invention, the switching transaction data 157 does not include any utility consumption data. Utility switching transaction data sources 120 may include the utility service provider 122 responsible for enrolling customers, the transmission distribution service provider (TDSP) who perform the field services, or any other intermediary that can provide access to switching transaction data 157 or other types of utility data. Illustrative examples of an intermediary would include governing bodies that oversee the utility market and have access to or store utility data.

Again, referring to FIG. 1, the utility notification system 105 may receive switching transaction data 157 from any provider or source of the switching transaction data, including third party aggregators, one or more utility service providers 122, such as an electric or gas utility, or any other utility switching transaction data sources 120. Since example embodiments of the invention exclude consumption data in the switching transaction data 157, the system and method of the invention may provide an advantage over systems using consumption data in terms of cost, error, delays, etc. associated with generating, receiving and processing such data. Accordingly, the utility notification system 105, and more particularly the utility notification module 135, described in greater detail below, may compare the tenant data 156 to the switching transaction data 157 to determine if the tenant 124 has taken responsibility for the utility service account. For instance, the utility notification module 135 may compare the switching transaction data 157 to the tenant data 156 (for example, one or more of the move-in, move-out, lease start, lease expiration, lease renewal, or notice to vacate dates) to determine if the tenant 124 has initiated and/or completed the process to sign-up for, switch to, or enroll with the appropriate utility service, as may be required by the tenant's agreement with the property owner/manager 118. The utility notification module 135 may then provide one or more notifications identifying when the tenant 124 fails to sign up for a utility service account or when the tenant 124 cancels their existing utility service account prior to the date the tenant 124 actual vacates the unit. According to example embodiments of the invention, the one or more notifications may include various alerts. The timing and content of the alerts may be customized by the property owner/manager 118, service provider or utility service provider 122 via an Internet accessible GUI, desktop application GUI or through one or more methods accessible by third party applications to facilitate the configuration of the one or more alerts. Additionally, the alerts may be configured for automatic transmission to the tenant 124, the property owner or manager, the utility service provider 122, or any third party authorized by the property owner or service provider. The above functions will be described in greater detail below with respect to FIGS. 1-5.

It will be appreciated that although in most instances a PMS is a software based system, it is meant to cover any possible means of tracking tenant 124 leases and occupancy including hardware solutions or even through software not normally associated with PMS such as an accounting system or via paper registries.

As described above, the utility notification system 105 is in communication with the one or more property management systems ("PMSs") 115 and one or more utility transaction switching data sources 120 via one or more networks 125, which can include the Internet. It will be appreciated that network 125 may include other networks, such as any combination of public or private local area networks (LANs) and/or wide area networks (WANs). It should also be appreciated that another embodiment of the invention allows the utility notification system 105 to be incorporated in a PMS 115 in whole or part. It is also possible for the utility notification system 105 to be incorporated into a system operated by one or more of the transaction switching data sources 120. In either case, the necessity of a network 125 to the utility notification system 105 might be altered or negated. According to an example embodiment, the utility notification system 105 may be incorporated in a PMS 115 such that a network between the PMS and utility notification system 105 is not required. Additionally, according to an embodiment of the invention, the utility notification system 105 may be maintained and operated by a utility service provider 122 and/or local to a utility service provider 122 such that a network between the utility service provider and utility notification system 105 is not required.

According to an example embodiment, as illustrated in FIG. 1, the utility notification system 105 may interface to systems associated with one or more utilities to obtain switching transaction data 157. For instance, switching transaction data 157 may also be obtained from a governing body that receives switching transaction data 157 from all of the utility service providers 122. An illustrative example of such a governing body is the Electric Reliability Council of Texas (ERCOT) in the State of Texas or Atlanta Gas and Light Company (AGL) in the state of Georgia. Switching transaction data 157 may also be obtained from a transmission distribution service provider (TDSP), which manages and maintains the hardware of a utility service. Switching transaction data 157 may also be obtained, for example, from a company that is responsible for transporting gas to the customer site, and/or from a company responsible for reading utility meters. Of course these are merely exemplary, as there are a myriad of governing bodies involved depending on the type and location of the utility service. Communications with those entities and/or their respective systems may utilize the one or more networks 125 and/or may utilize one of more other networks (not illustrated) and/or dedicated communication links. Still other entities may provide switching transaction data 157 to the notification system 105.

It will be appreciated that the methods of communicating with the utility notification system 105 may include any standard method of communication. Thus, embodiments of the invention are not limited to a system in which the utility notification system 105 receives communications in a particular format or mode, or via particular hardware. For instance, although embodiments of the invention can be implemented by utilizing the Internet to facilitate communications directly between a particular PMS 115 and the utility notification system 105, any variety and/or combination of other communication methods can be used to interact with the utility notification system 105. For instance, according to one aspect of the invention, Electronic Data Interchange (EDI) may be used to collect the tenant 124 and/or switching transaction data 157. Other formats may also be implemented. Moreover, although not described in detail herein, it will be appreciated that some or all communications in the utility theft elimination system 100 shown in FIG. 1 may be secure to maintain the confidentiality of data and to authenticate users of the utility theft elimination system 100.

As shown in FIG. 1, the utility notification system 105 may include at least one interface with the PMS(s) 150 to permit the utility notification system to collect tenant data 156 from the one or more PMS(s) 115 on a daily basis. The interfaces with the PMS(s) 150 permit the utility notification system 105 to receive tenant data 156 from PMS(s) 115 employing different software, data formats, communication protocols, and the like, as there are a number of different such systems employed in the market. Similarly, the utility notification system 105 may include one or more interfaces with utility companies or utility service providers 122 to permit the receipt of utility switching transaction data 157 from utility service providers 122 or utility switching transaction data sources 120 employing different software, data formats, communication protocols, and the like. It should be appreciated that the utility notification system 105 can be fully integrated into a PMS 115 in which case the PMS interface and utility notification's 105 PMS interface 150 can be the same. Furthermore, it should be appreciated that the utility notification system 105 can be fully integrated into utility service provider 122 software which stores switching transaction data 157 in which cace the utility service provider's interface and the utility notification's 105 utility service provider interface 151 can be the same. It will also be appreciated that although the receipt of tenant 124 and switching transaction data 157 is described herein as an automated process, such information may also be manually entered into the utility notification system 105. Also, according to embodiments of the invention the utility notification system 105 may include at least one interface with the PMS(s) 150 to permit property owners/managers 118 to locally or remotely configure and manage the notification settings, via a web or desktop based graphical user interface or by third party software.

In addition to allowing for the receipt of tenant data 156, the interfaces with the PMS 150 also allow property owners/managers and staff to manage their notification rules 158 or perform any other actions that might be necessary to configure the operation of the utility notification system 105. Similarly, the interfaces with the utility data source 151, in addition to allowing for the receipt of switching transaction data 157, also allows staff working for the one or more utility switching transaction data sources 120 to manage their notification settings or perform any other actions that might be necessary to configure the operation of the utility notification system 105. The interfaces involved include graphical user interfaces (web or desktop), APIs, web services, configuration files or any other means as known to those skilled in the art. It should be appreciated that the utility notification system 105 can be integrated into a PMS 115 in which case the PMS 115 interface and utility notification system's 105 PMS interface 150 can be the same. In addition, it should be appreciated that the utility notification system 105 can be integrated into utility switching transaction data source 120 provider's software in which case the utility data source provider's interface and the utility notification's 105 utility data source interface 151 can be the same. Furthermore, it should be appreciated that various interface components within the utility notification system 105 could reside outside of the utility notification system 105 or could be integrated in whole or part within a 3rd party's software solution.

According to an example embodiment, the utility notification system 105, and more particularly the utility notification module 135 described in greater detail below, may compare the tenant data 156 to the switching transaction data 157 to determine if the tenant 124 has taken responsibility for the utility service account, and/or to verify that the tenant is maintaining the service for the duration of their occupancy. For instance, the utility notification module 135 may compare switching dates in the switching transaction data 157 to the tenant's 124 move-in, lease start, lease renewal, lease expiration, notice to vacate or move-out date to determine if the tenant 124 has initiated and/or completed the process to sign up for, switch to, or enroll with the appropriate utility service, as may be required by the tenant's 124 agreement with the property owner/manager 118. In addition, the utility notification module 135 may compare the switching transaction data 157 switching dates through the duration of the tenant's 124 occupancy to make sure the tenant 124 maintains the appropriate utility services in compliance with their lease. The utility notification module 135 using notification rules 158 can then provide one or more alerts identifying when the tenant 124 fails to sign up for a utility service account or when the tenant 124 cancels their existing utility service account prior to the date the tenant 124 actually vacates the unit. According to an example embodiment, the utility notification system 105, and more particularly the utility notification module 135 may compare the tenant data 156 to the switching transaction data 157 to determine if the tenant 124 has taken responsibility for the utility service account, and/or to verify that the tenant is maintaining the service for the duration of their occupancy. The comparison of the switching data 157 to the tenant data 156 may be triggered by the new receipt of either the switching data 157 or the tenant data 156, and therefore, an associated notification based on the comparison may be available for sending immediately after the comparison is performed. Therefore, a notification that a tenant has been identified as an unauthorized user of utility services may be sent within one second, one minute, one hour, one day, or one week of receipt of either the switching data 157 or the tenant data 156.

According to an example embodiment of the invention, the recipients, timing, delivery method, format and content of the alerts or notifications may be customized by the property owner/manager 118, provider of the service or system 100, utility service provider 122, or any other entity that has a stake in the process via the PMS interfaces 150 or interfaces with utility switching data transaction sources 151. According to an example embodiment of the invention, the notification recipients, timing, delivery method, format, and content may be setup or pre-setup with generic or default notification recipients, timing, delivery method, format, and content, and they may each be customized and updated with new default settings via notification configuration instructions by the property owner/manager 118, provider of the service or system 100, utility service provider 122, or any other entity that has a stake in the process via the PMS interfaces 150, processors, or interfaces with utility switching data transaction sources 151. Furthermore, according to an example embodiment of the invention, one or more notifications can be provided using one or more of: e-mail, Graphical User Interface, web services, instant messaging, SMS messaging, automated telephone notification, report, U.S. mail, delivery service, fax, or private courier, or any standard communication channel available. Additionally, the alerts or notifications may be configured for automatic transmission to the tenant 124, the property/manager 118, the utility service provider 122 or any third party authorized by the property owner or service provider. These functions will be described in greater detail below with respect to FIGS. 1-5.

According to an example embodiment, the utility notification system 105 of the utility theft elimination system 100 also may include an apparatus comprising a processor 140, operating system 145, bus 160, and one or more storage devices 155 in addition to the interfaces 150, 151 and the aforementioned utility notification module 135 residing within a memory 110. The bus 160 may include data and address bus lines to facilitate communication between the processor 140, operating system 145 and the other components within the utility notification system 105, including the memory 110, the interfaces with the PMS(s) and the utility service provider (s) 150, 151 and the one or more storage devices 155. The one or more storage devices 155 may be connected to the bus 160 by an appropriate interface and can include random access memory, read-only memory, a hard disk drive, a floppy disk drive, a CD-Rom drive, DVD-Rom drive, optical disk drive, or the like, for storing information on various computer-readable media, such as a hard disk, a removable magnetic disk, or a CD-ROM disk. In general, the one or more storage devices 155 provide non-volatile storage to the utility notification system 105. According to one aspect of the invention, the system 105 may represent a system of distributed components that are connected by the bus 106. The processor 140 may execute the operating system 145, and together the processor 140 and operating system 145 may be operable to execute functions implemented by the utility notification system 105, including executing software applications stored in the memory 110. The memory 110 may include random access memory, read-only memory, a hard disk drive, a floppy disk drive, a CD-Rom drive, a DVD-Rom drive, optical disk drive, or the like, for storing information on various computer-readable media.

It should be appreciated that although the utility notification module 135 is described herein as software residing within the memory 110, the utility notification module 135 may alternatively include a combination of software and hardware, or only hardware. Furthermore, although illustrated as located entirely within the utility notification system 105, one or more of the utility notification system 105 components can be distributed such that they are in whole or part external to the utility notification system 105. As an illustrative example, the one or more storage devices 155 may in fact be external to the utility notification system 105. Additionally, one or more of the files 156-159 within the one or more storage devices 155 may be located external to the utility notification system 105 and accessed remotely. In an additional example embodiment, the processes used by the interface 150 and/or 151 to manipulate the data from one or more PMS 115 and/or utility switching transaction data sources 120 may be external to the utility notification system 105. In this example embodiment, data in a common format might be interfaced via a network 125 into the respective tenant data 156 or switching transaction data 157 storage device.

Further, it should be also appreciated that one or more of the utility notification system 105 components described with respect to FIG. 1 may comprise several components, which are either local to each other or which operate in conjunction with each other to permit the utility notification module 135 to perform the processes described herein. One or more of the utility notification system 105 components may also be combined and/or may be distributed on different computers, systems, platforms, and the like. Therefore, it should be appreciated that the illustrative system 100 shown in FIG. 1 is exemplary, and that almost any combination of software and/or hardware may be utilized to perform the functions described herein. The methods and processes implemented by the utility notification system 105 and the utility notification module 135 will next be described with reference to FIGS. 2 and 3.

Specifically, to implement the methods described herein, according to an example embodiment of the invention, the processor 140 and operating system 145, with the utility notification module 135 and I/O interface(s) 150 and 151, may receive commands and instructions and execute the functions described herein. Among other functions, these commands may include configuration commands, which may be retrieved from the notification rule data 158 from an entity associated with a PMS 115, such as a property owner/manger 118 or an entity providing embodiments of the invention to entities associated with PMS 115. Furthermore, these commands can include configuration commands from the utility service provider or an entity providing embodiments of the invention to the utility service provider. The commands permit the type, timing, delivery method, content, and format of the alerts provided by the utility notification module 135. The configuration commands may also identify the recipient of the one or more alerts, which may include the tenant 124 that has failed to take responsibility for payment of utilities, a property owner/manager 118, utility service provider 122 and/or any third party authorized by the property owner/manager 118 or utility service provider 122. Other alerts include but are not limited to those related to cancellations, date changes, property initiated shut-offs, and estimated recovery bills. According to one aspect of the invention, the utility service provider 122 may receive an alert instructing them to turn off the tenant's 124 service, which could occur, for instance, when the tenant 124 fails to respond to a previous alert. However, a previous alert is not required before such a communication with the utility and cut-off action is taken.

According to an example embodiment of the invention, the utility notification module 135 may be operable to store and retrieve data from the one or more storage devices 155, including tenant data 156 received from the one or more PMS(s) 115 and switching transaction data 157 received from one or more utility service providers 122. It should be appreciated that the tenant data 156 and switching transaction data 157 may include data in the same format received from the one or more property management system(s) 115, utility service providers 122, and/or utility switching transaction data sources 120. However, the tenant data 156 and switching transaction data 157 can also include tenant data 156 and switching transaction data 157 that has been modified from the format received by the utility notification system 105. Thus, the interfaces with the PMS(s) and utility service providers 122, the utility switching transaction data sources 120, and/or the utility notification module 135 may modify and store the tenant data 156 and switching transaction data 157 in a format or different from that in which it is transmitted via the network 125. According to one aspect of the invention, all tenant data 156 and switching transaction data 157 within the storage devices 155 can be converted to a common format, prior to storage, for later retrieval by the utility notification module 135.

According to embodiments of the invention, the one or more storage devices 155 can also include historical data 159 and notification rule data 158. The historical data 159 can include any data generated by the utility notification module 135, such as utility service account status, alerts (or notices), status of alerts, historical information related to tenants 124 and properties, utility-related data associated with a tenant or property (such as recovery expenses), and the like. Thus, the historical data 159 may include the results of the comparison of tenant data 156 and switching transaction data 157 performed by the utility notification module 135 to identify those tenants 124 that have not yet signed up for a utility service, but should have, or those tenants 124 that have cancelled service earlier than permitted under a lease or similar agreement with a property owner/manager 118. The historical data 159 may also include alerts of cancellations, date changes, property initiated shut offs, and estimated recovery bill amounts. According to one aspect of the invention, the historical data 159 includes records for each tenant 124 associated with a property, where the records include up-to-date, utility specific information, as well as detailed information concerning alerts, tenant 124 status, recovery costs and various settings important to the specific tenant 124 property relationship such as occupant count, rates used to calculate estimated bills, billing fees and tenant 124 contact information. Furthermore, the historical data 159 may include information about the property owner or owners, property or properties, and unit or units, such as address, contacts, size, heating method, contracts, for example. According to one aspect of the invention described in detail below, pay-per-view information may be included in the historical data 159. The generation of the historical data will be described in further detail below with reference to the block diagram flowcharts of FIGS. 2 and 3.

According to example embodiments of the invention, the notification rule data 158 can include data specifying the recipient, timing, deliver method, format, and content of alerts from each of the one or more property managers, property owners, staff, utility service provider or any other third party approved by the property owner, manager or service provider. Thus, the notification rule data 158 may be customized by each property staff, utility service provider, or any other third party approved by the property owner, manage, or utility theft elimination system 100 service provider to identify the number of days that should pass before an alert is transmitted, the recipients of the alert, the type of alert transmitted, and the means by which an alert is transmitted. According to one aspect of the invention, the notification rule data 158 can be included within the historical data 159.

According to an embodiment of the invention, the utility notification module 135 may be further operable to provide user interaction controls, such as graphical user interfaces, (GUIs), voice and keypad activated telephone controls, or web-based interfaces that permit a user associated with the one or more PMS(s) 115, utility service provider(s) 122, utility switching transaction data sources 120, and/or a third party operator of the utility notification system 105 to access, review, and modify, via the PMS interfaces 150, the alerts transmitted to tenants 124 that fail to sign up for utility service, or attempt to cancel service before they vacate the unit. The interfaces 150 can also provide reports to property owners/managers 118, property staff or third party operators of the utility notification system 105 to indicate the current utility status of all properties, including individual units as well as the history of all properties, units, and tenants 124. The utility status can include an identification of the person or entity responsible for a utility service for a particular unit, as well as the dates of responsibility, whether utility service enrollment is up-to-date, prior recovery amounts, and the current recovery amount. Other interfaces 150 are provided to effect the entry of the user commands described above. Thus, interfaces 150 are available to permit a property owner/manager 118, property staff, and/or third party operators of the utility notification system 105 to notify a utility service provider 122 that a utility service should be shut-down, or to customize the alerts, and to view and print statistical information related to the utility status of a single unit or the utility status of units summarized by property, region or property owner level. Furthermore, the GUIs may be used by a property manager or third party to manually enter data, such as tenant data 156, switching transaction data 157, and the like, which may allow use of the utility notification system 105 without the use of one or more PMS(s) 115 and/or utility switching transaction data sources 120.

Figure 2:
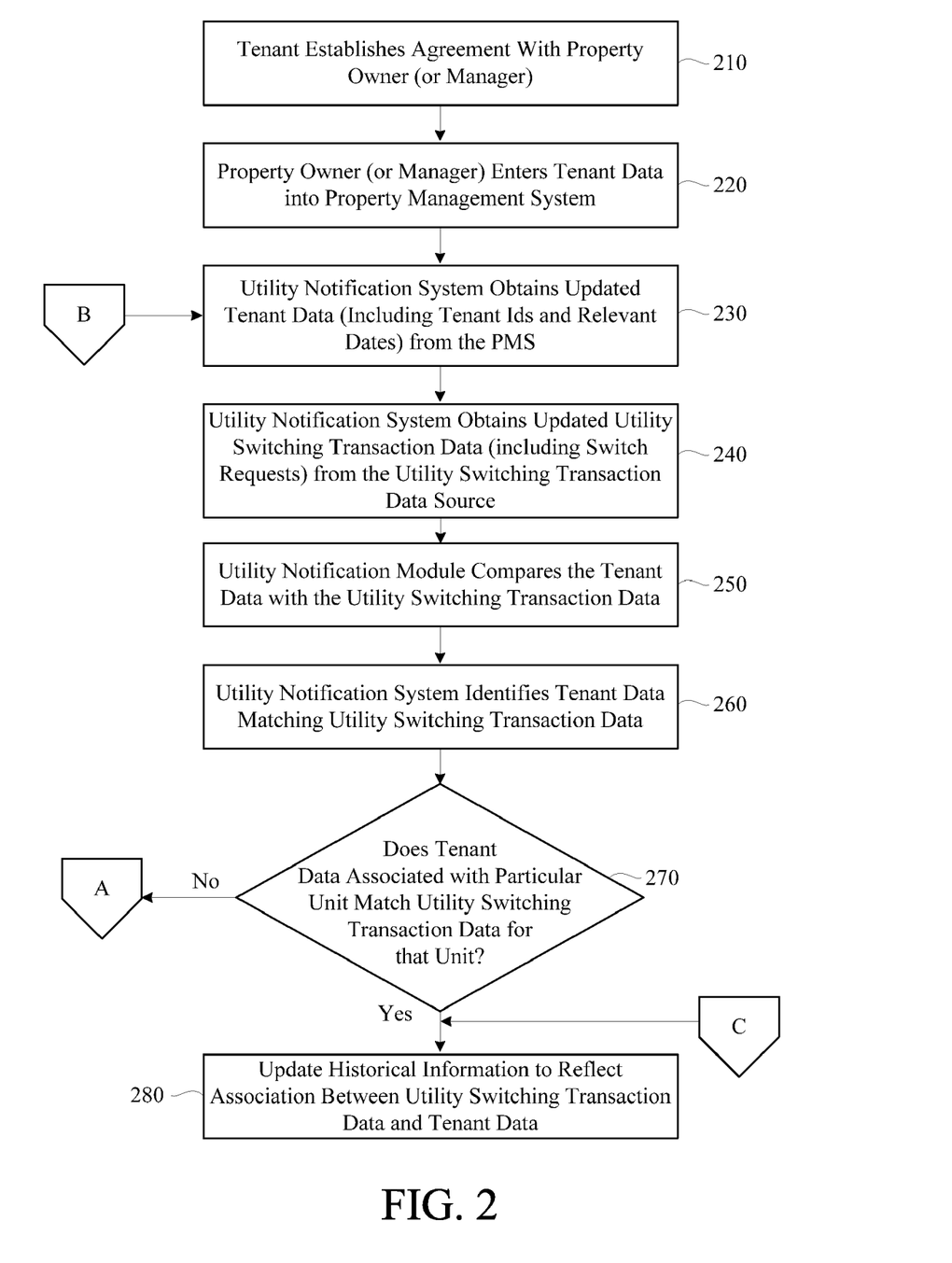
FIG. 2 shows a block diagram flow chart illustrating a notification setup and initial process performed according to an example embodiment of the invention.
Figure 3:
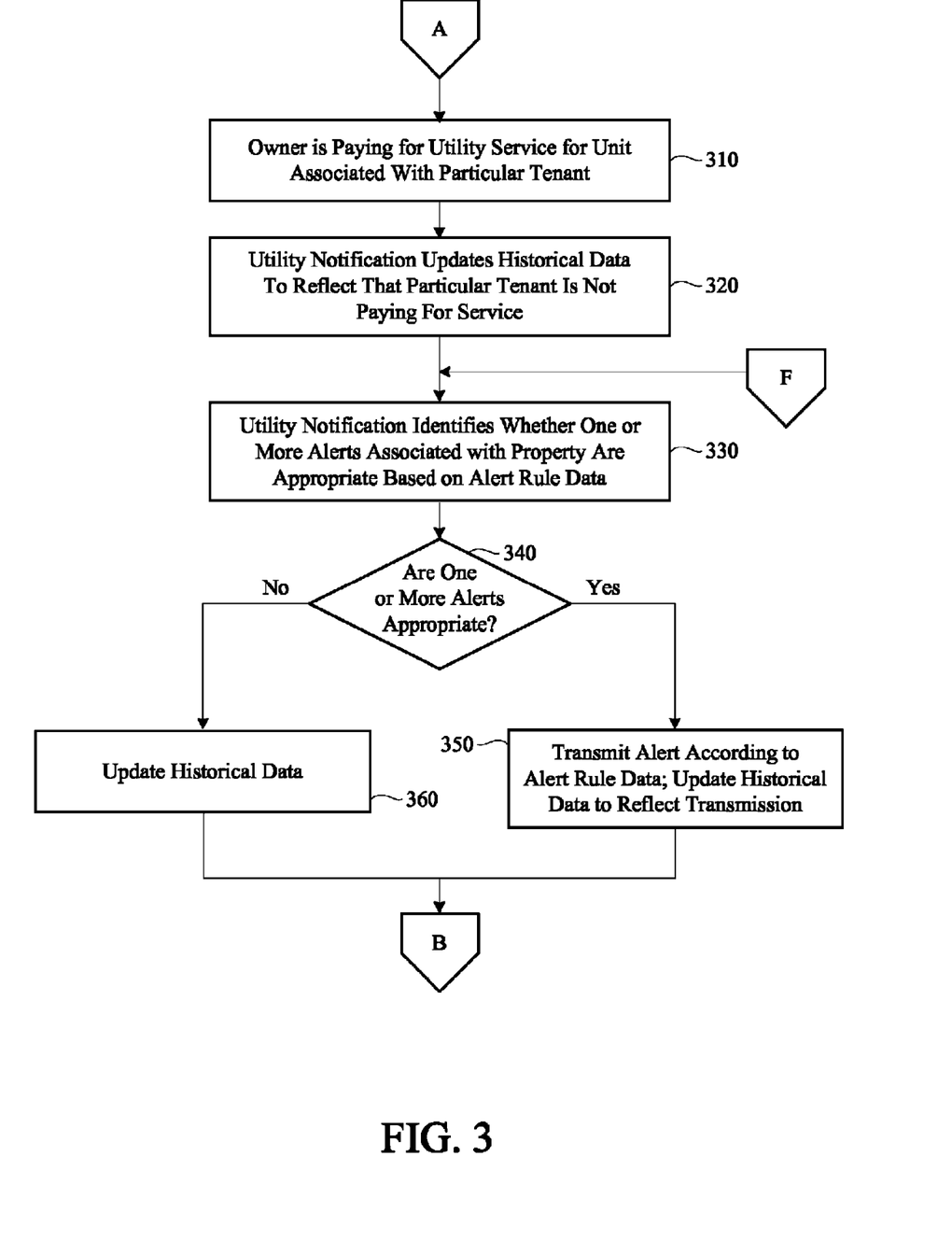
FIGS. 3-5 show block diagram flow charts illustrating example decision branches according to an example embodiment of the invention.

FIGS. 2 and 3 depict an exemplary notification process performed in accordance with an example embodiment of the invention. It will be appreciated that the example notification process will be described with respect to a single tenant 124, PMS 115, and a utility switching transaction data source 120. However, the process described with respect to FIGS. 2 and 3 may apply to one or more of any such parties. It should also be appreciated that the notification process may begin with a tenant 124 that is new to the property (block 210) however, for residents already established within the PMS 115 the entry point would be block 230. Furthermore, it should be understood that the notification process depicted can occur at any frequency necessary but is generally based on the availability of tenant data 156 and switching transaction data 157, however, receipt of new data is not necessary for the process to occur.

The process depicted commences with the establishment of an agreement, such as a rental or lease agreement, with a property owner/manager 118 (block 210). The property owner/manager 118 may then enter the tenant data 156 into a PMS 115 (block 220). It should be appreciated that, although in this example the owner/manager 118 is entering the data for a new tenant 124, they could just as well be making updates to an existing tenant 124 within their system.

Next, the PMS 115 may transmit or permit access to tenant data 156 (block 230). This can be the result of a request for the tenant data 156 from the utility notification system 105, which may occur at regular intervals such as daily, or the result of a scheduled push of information to the utility notification system 105. Additionally, it will be appreciated that because the utility notification system 105 may reside wholly within a PMS 115, the tenant data 156, may already exist in a database local to the PMS 115 such that retrieval is not required. The tenant data 156 may include information such as the property owner's name, the property's name, the unit number, building number, other owner/property/unit identifiers, tenant name, tenant billing information and other tenant identifiers. In addition the tenant data 156 may include one or more of the actual move-in date, lease start date or lease renewal date and/or at least one of the lease expiration date, expected move-out date, notice to vacate date or actual move-out date. This information can be stored by the utility notification module 135 as tenant data 156 within the one or more storage devices 155, and various elements of the received tenant data 156 can also be used to update the historical data 159 within the one or more storage devices 155 by the utility notification module 135. Updated tenant data 156 is not required for the utility notification system 105 to continue on to the next step (block 240).

According to an example embodiment, the utility notification system 105 thereafter may obtain updated utility data from the utility switching transaction data sources 120 or from the utility service provider 122 (block 240). This can be the result of a request for the switching transaction data 157 by the utility notification system 105, which may occur at regular intervals such as daily, or the result of a scheduled push of information to the utility notification system 105. Additionally, it will be appreciated that because the utility notification system 105 may reside wholly within a system operated by a utility service provider 122 or a utility switching transaction data source 120, the switching transaction data 156, may already exist in a database local to that system and as such retrieval from an external source, for example via a network, or the Internet, may not be required.

According to one aspect of the invention, the updated switching transaction data 157 obtained from the utility switching transaction data source 120 or the utility service provider 122 (block 240) may include any updated (i.e., new or altered) switching transaction data 157 not previously received by the utility notification system 105. It should be appreciated that switching transaction data 157 in different forms might also be obtained. For example, according to an example embodiment of the invention, the switching transaction data 157 may include the current status of the account with the utility service provider 122 and/or current updates plus any updates that occurred in the past or for a specified period of time in the past. In another example embodiment, the switching transaction data 157 may include just the current status of the account with the utility service provider 122 as of the point in time when the file was created. In instances where switching transaction data 157 is not in the form of an update the utility notification system 105 can utilize historical data 159 and the current switching transaction data 157 to determine the incremental differences. The updated switching transaction data 157 can include, among other information, the identity of a property, the name or identity of the current utility service account holder, and whether utility service has been established, cancelled, removed from the Continuous Service Agreement (CSA), placed under the CSA, or disconnected. The identification of whether utility service has been established or cancelled for a tenant 124 in a particular property may include a switch request, where the switch request identifies the establishment of new service or the termination or cancellation of service by a tenant 124 for a particular property.

According to another example embodiment, the identification of whether utility service has been established or cancelled for a tenant 124 in a particular property may include, or be represented by a flag indicating whether the utility service is under CSA or not. A switch request can be further represented by separate components, where each complete switch request can have one or more specific parts. These parts may include initiation, cancellation and date changes requests as well as a completion record when the switch request has been completed. Other information that may be obtained may include the name and identity of the utility service provider, though that data may be received separately from the utility notification system 105. Similar to the tenant data 156, updated switching transaction data 157 is not required to continue on to the next step (block 250) in the process. The switching transaction data 157 can be stored by the utility notification module 135 as switching transaction data 157 in the one or more storage devices 155. Furthermore various elements of the received switching transaction data 157 can also be used to update the historical data 159 within the one or more storage devices 155 by the utility notification module 135.

Next, according to an example embodiment, the utility notification module 135 may compare the tenant data 156 with the switching transaction data 157 (block 250) to identify tenant data 156 that matches switching transaction data 157 (block 260). The comparison (block 250), identification (block 260) and processing of a match (block 270) are discussed in detail with respect to FIG. 4. As shown in FIG. 2, if the tenant data 156 associated with a particular unit matches the switching transaction data 157 (block 270) for the same unit, then the utility notification module 135 may update the historical data 159 to reflect the switching transaction data 157 associations between the particular tenant data 156 and the switching transaction data 157 (block 280). That historical data may be subsequently accessed by the utility notification module 135 to generate notifications, exposed through the interfaces 150 151, and the like. A match may occur when the tenant 124 has switched to, or enrolled with, a utility at any time before or after moving into the unit. A match may also continue to occur as long as the tenant 124 remains compliant with the lease's requirements related to active utility services.

When tenant data 156 fails to match the switching transaction data 157 (block 270), the owner may be paying for the utility service associated with a particular tenant 124 (block 310). This information is updated in the historical data 159 (block 320) so that it may be presented to a property owner/manager 118, utility service provider 122, tenant 124, or others as needed via an interface 150 151, or via an alert that can include an email alert, a letter, a report, a telephone call, a fax, or any other available means of communicating information. Next, the utility notification module 135 identifies whether one or more alerts associated with a property are appropriate based on notification rule data 158 stored in the one or more storage devices 155 of the utility notification system 105. Notification rule data 158 specific to when tenant data 156 fails to match the switching transaction data 157 may be stored for each property or property owner, and may identify the schedule by which various alerts will be sent to a tenant 124, utility service provider 122, or any other recipient configured. Notification rule data 158 may also control the recipient, delivery method, format, and content of an alert to be transmitted.

According to one aspect of the invention, the notification rule data 158 may permit a property owner/manager 118 to configure multiple alerts to occur after the passing of consecutive deadlines. For instance, for a tenant 124 that fails to create a utility service account after move-in, an email alert might be sent to the tenant 5 days from the tenant's move-in date, and a letter may be sent after 7 days. Each alert generated by the utility notification module 135 may have content customized by the property owner/manger 118 via one or more interfaces 150. Therefore, in determining whether an alert is necessary, the utility notification module 135 may compare the violating tenant's data 156, such as move-in date, with the present date and the rules established by the property owner/manager 118 corresponding to the tenant 124. Similarly, when a utility data switch is received indicating a return of the utility service to the property's name, the utility notification module 135 may compare that date with the tenant's data 156, such as their move-out date, expected move-out date or lease-end date as well as the present date to determine if an alert is necessary. It will be appreciated that the use of individual records of alert rule data 158 for each property owner/manager 118 permits customization of the system.

According to an example embodiment of the invention, if the utility notification module 135 determines if one or more alerts are appropriate (blocks 330, 340), then the one or more alerts may be transmitted according to the notification rule data 158 (i.e., the type, content, delivery method and recipient) and the historical data is updated to reflect their transmission (block 350). Among other types of alerts, the utility notification system 105 is operable to transmit a communication, on behalf of a property owner/manager 118, to the utility service provider 122 or any other utility switching transaction data sources 120, indicating that the utility service account is not the responsibility of the property owners/managers 118, and that the utility service associated with the account should be shut off, disconnected or otherwise removed from the property's name. On the other hand, if one or more alerts are not appropriate (block 340), then the historical data 159 can be updated to reflect that the tenant data 156 does not match the switching transaction data 157, but that alerts have not been transmitted (block 360). This information may be presented to a property owner/manager 118 via one or more interfaces with PMS 150.

According to another embodiment of invention, when the utility notification module 135 determines one or more alerts or notifications are appropriate, one of those alerts or notifications transmitted (block 350) might include a bill to the tenant 124 for recovery of expenses and fees during the duration of their violation or a portion thereof. The calculation of the recovery bill can be, for example, based on a per day flat rate for which each day of violation is multiplied by that daily rate. According to another example embodiment of the invention, the bill to recover expenses and fees from the tenant 124 may be calculated based on market consumption averages and the property's contracted rate for that commodity. Additional factors can be included in the calculation of a bill such as unit size, occupant count, square footage, heat source (example: gas or electric), region (state, county, zip code or other geographically defined areas), appliances types, or any other factor which might impact the consumption of a given utility. According to an example embodiment, the notifications may include information identifying a tenant associated with the tenant data, an indication of the dates of detected unauthorized use of utility service, an indication of a daily fee rate for unauthorized use of utility service associated with the premises, an indication of a total fee amount to be charged, or an indication of historical data associated with the tenant. As with most other notifications, the bill may be configurable by the property owner/manager 118 via one or more interfaces 150. The configurations include content, delivery methods, timing and recipients. Bill calculation components may be stored within the notification rule data 158.

Figure 4:
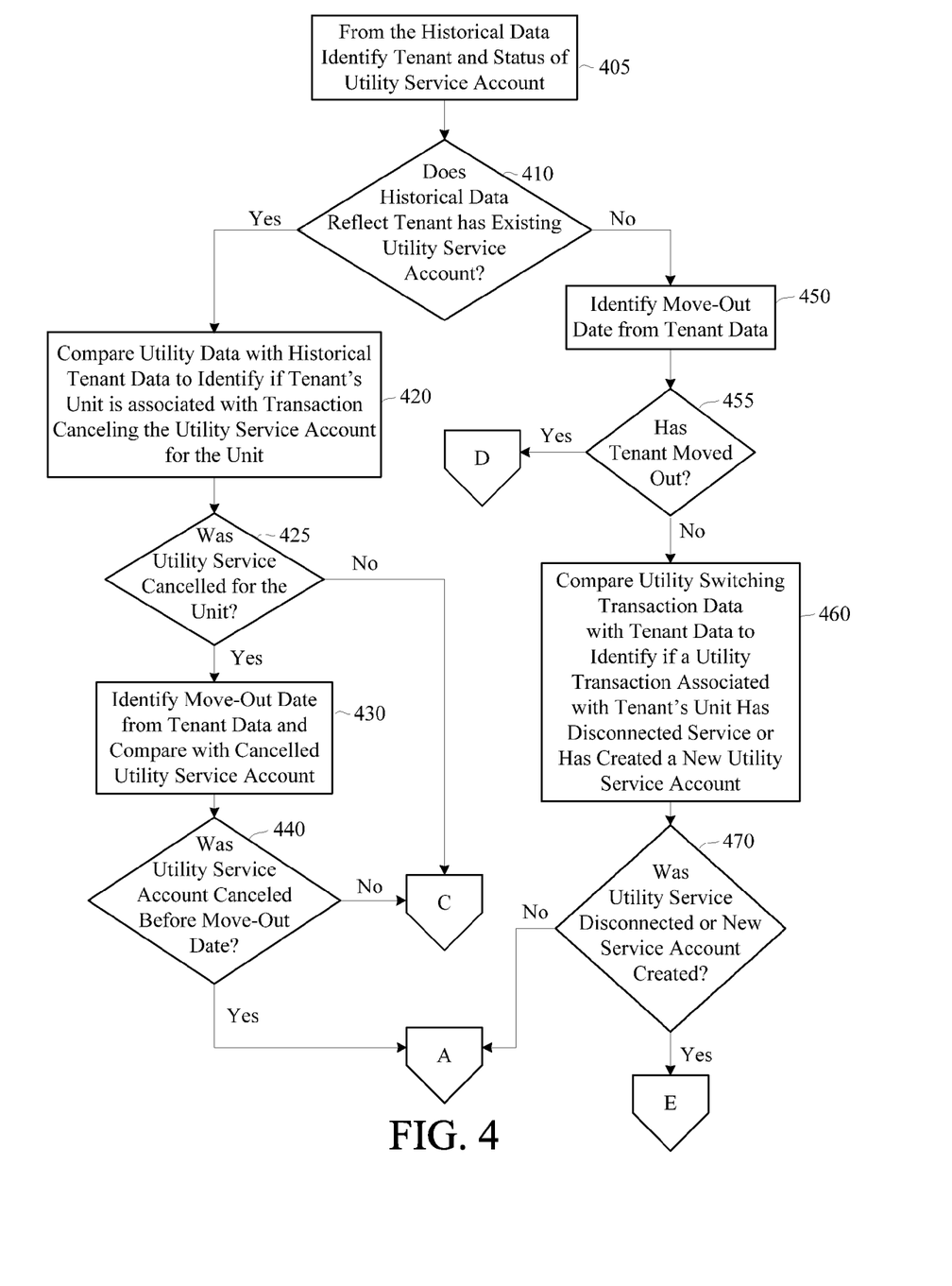
Figure 5:
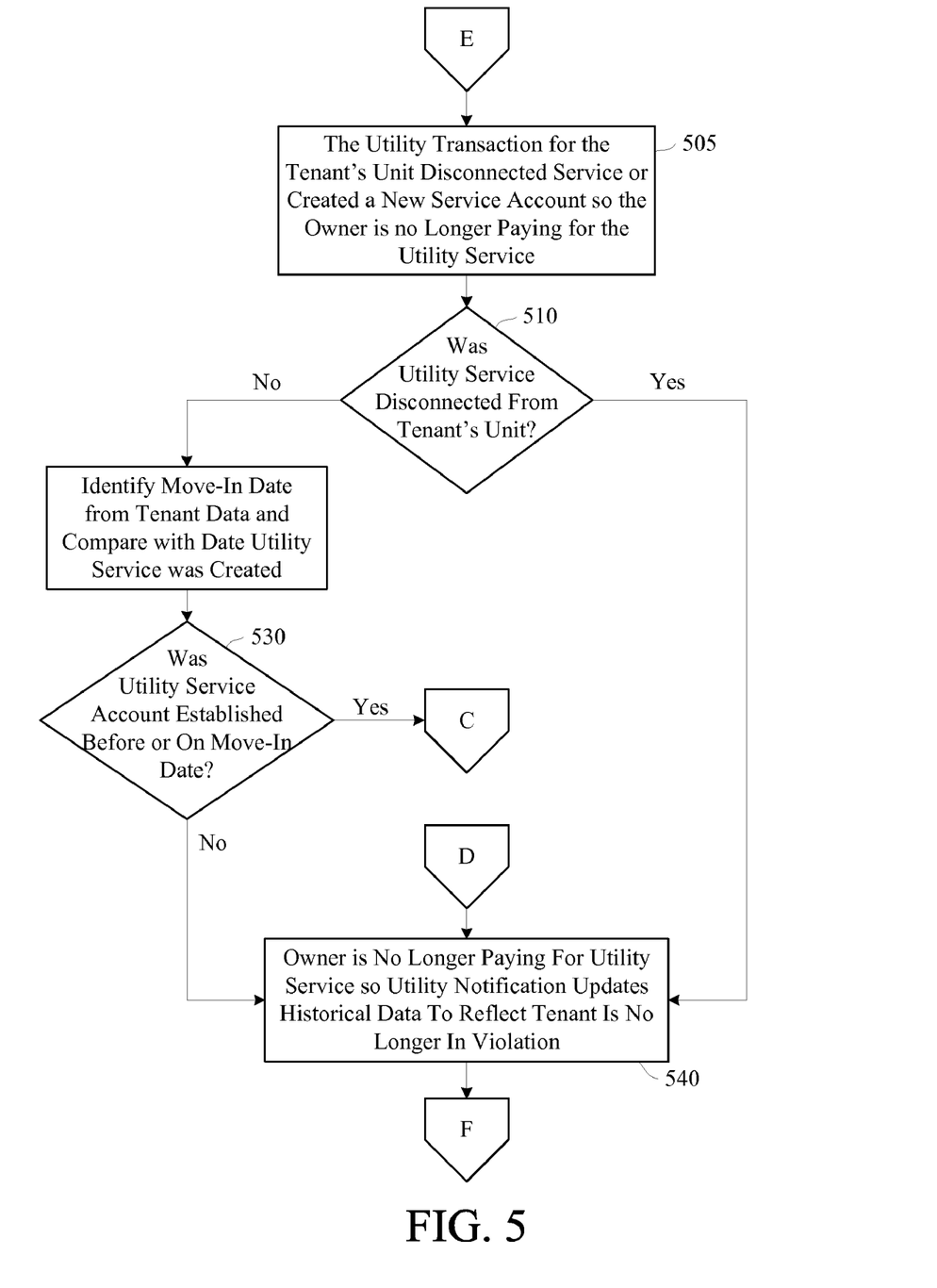

Next, FIGS. 4 and 5 show a detailed views of the process for comparison, identification and matching (blocks 250, 260 and 270) of tenant data 156 and switching transaction data 157. As with FIGS. 2 and 3, it will be appreciated that the notification process will be described with respect to a single tenant 124 and the switching transaction data 157 related to that tenant's unit. However, the process described with respect to FIGS. 4 and 5 may apply to one or more of any such parties. As an aspect of the invention detailed earlier, for the purpose of this process example, it will be assumed that when tenant data 156 for a new resident is first received (block 230) the historical data 155 was updated such that the tenant 124 does exist in the historical data, and by default, was established as a tenant 124 without an existing utility service.

According to an example embodiment of the invention, and with reference to FIG. 4, the process may identify the historical data 159 for the tenant 124 and the status of the utility service for that tenant 124 (block 405). If the historical data 159 reflects that the tenant 124 has an existing utility service account (block 410), then the utility notification module 135 will ascertain whether the tenant 124 is still maintaining the service in their name or has cancelled the utility service (block 420). If the tenant's 124 utility service account has not been cancelled, then the historical data 159 is updated to reflect a tenant 124 in good standing, as shown in block 280 of FIG. 2. Another aspect of the invention but not illustrated here deals with situations in which the utility service is still in the tenants 124 name however, the utility data indicates that the utility service account has a pending cancellation. In this case the utility notification module 135 may update the historical data 159 to reflect the tenant 124 is still in good standing but will also indicate the tenant 124 has a pending cancellation action along with the date that cancellation will take effect. In that event, the utility notification module 135 may identify the tenant's 124 move-out date (or lease-end date or expected move-out date), if available, from the tenant data 156 and compare it with the cancel pending or cancelled utility service account (block 430) to determine if the action occurred before the tenant 124 has vacated the unit (block 440). If the utility service is cancelled prior to the tenant 124 vacating the unit, the process continues at block 310 of FIG. 3. On the other hand, if the utility service account was not canceled or was canceled after the tenant 124 vacated the unit, then the historical data is updated to reflect a tenant 124 in good standing, as shown in block 280 of FIG. 2.

When the utility notification module 135 finds that the historical data 159 does not indicate the existence of a utility service account (block 410) for the tenant 124 then that means the utility service is still in the property's name and the property is liable for the utility costs. According to an example embodiment of the invention, the utility notification module 135 may identify the tenant's 124 move-out date or any other indicator that the tenant 124 has vacated, such as a tenant 124 status (block 450) and may determine if the tenant 124 has vacated the unit (block 455). If the tenant 124 has vacated the unit, the process will continue at block 540 of FIG. 5, otherwise the process continues with block 460. The utility notification module's 135 next step is to compare the switching transaction data 157 with the tenant data 156 to identify if there is one of two utility transactions for the tenant's unit: one which disconnected service, or one which created a new utility service account (block 460). If it is determined there is not one of these two transactions (block 470) then the process continues at block 310 of FIG. 3, otherwise, the process will then proceed to block 505 of FIG. 5. Another aspect of the invention, which is not illustrated here, deals with situations where there is a disconnect transaction pending (not yet completed) or a new utility service account is being created but not yet finalized for the tenant's unit. In either case the utility notification module 135 will still continue at block 310 of FIG. 3 but also the historical data 159 will be updated to reflect there is a pending disconnect or new service request along with the date the transaction should be completed. This information can result in one or more alerts to the property owner/manager 118, utility service provider 122 or any other party authorized by the property.

According to an example embodiment of the invention, after the utility notification module 135 has determined that utility service is not enrolled under the tenant's name but there was a transaction to either disconnect service or create a new utility service account for the tenant's unit (block 505)

the process must now determine which type of transaction occurred (block 510). If and when the utility service was disconnected, the utility notification module 135 may update the historical data 159 to reflect that the tenant 124 is no longer in violation (block 540) and it may perform any steps necessary to finalize that tenant's violation record within the historical data. In the event the utility data 157 transaction was creating a new utility service account, then the next step in the process identifies the move-in date (or lease start date or lease renewal date) from the tenant data 156 and compares it with the date the utility service was established for the tenant 124 in the utility data 157 (block 520). A determination is then made as to whether the utility service was established before or on the date the tenant 124 moved-in (block 530). In the event the tenant 124 did establish service before or on the date of move-in as required by their agreement with the property then the historical data is updated to reflect a tenant 124 in good standing, as shown in block 280 of FIG. 2. Otherwise, the utility notification module 135 updates the historical data 159 to reflect the tenant 124 is no longer in violation (block 540) and performs any steps necessary to finalize that tenant's violation record within the historical data. After the utility notification module 135 updates the historical data in block 540 the process proceeds to block 330 of FIG. 3.

According to example embodiments, the invention may provide an option to generate estimated bills for use in recouping the costs of utilities paid for by the property owner/manager 118 during periods when the tenant 124 was responsible. Estimated bills can be calculated in different ways. According to one, example the bill can be estimated through the use of a flat rate multiplied by the days of violation. According to another example, the bill can be estimated by multiplying each day of the violation by the averaged daily utility consumption for the specific day by the property's utility rate. According to another example, the bill can be calculated based at least on an estimated cost for the utility service. According to another example, the bill can be calculated based at least costs to recover the estimated utility costs for unauthorized use of the utility service. An estimated bill can be calculated at the point the tenant 124 switches the utility into their name and no longer is in violation or it can be calculated on scheduled days. Once calculated, the utility notification module can send the estimated bill information to entities using the PMS and/or to the violating tenant 124 by one or more of the previously mentioned alert communication methods. In addition accounting information related to the estimated bill amounts can be sent via one or more networks 125 back to the PMS or to an accounting system used by the PMS using entity. Calculated amounts are then stored in the historical data 159. All parameters used by the utility notification module 135 to produce the estimated bills are configurable within the utility notification system and those configurations are stored in the alert rule data 158 in one or more storage devices 155.

According to various embodiments of the invention, the utility theft elimination system 100 may identify missed billing opportunities for units that are not under a CSA, and therefore, may inadvertently be omitted from utility billings. Such a situation may exist, for example, when the utility company's records indicate that a certain number of units in an apartment complex are under a CSA, but in actuality, there may be additional units that are receiving utility services, but may not be listed under the CSA. In such a case, the utility theft elimination system 100 can identify such units, and an alert may be sent to the appropriate entity associated with the utility service provider 122 to correct the records, and/or to include those units within the CSA.

According to example embodiments of the invention, the period of responsibility for which a tenant 124 may be responsible for utility service may be calculated without any usage, consumption, or meter data, but rather, may be determined by comparing dates. According to example embodiments of the invention, the switching transaction data 157, obtained by sources including the utility service provider 122 and any number of utility switching transaction data sources 120, may contain utility service account identification information, and date information. According to example embodiments of the invention, is not necessary that the switching transaction data 157 contain usage, consumption, or meter data because the period of responsibility for which the tenant 124 may be responsible for utility service can be calculated based on switching transaction dates only.

According to example embodiments of the invention, the utility theft elimination system 100 can use market or utility enrollment information to identify tenants 124 who have the potential to be a violator prior to the actual violation, or prior to any liability In an example embodiment, the property management system 115 may reside at or near the premises where the property owner/manager 118 manages the premises. In another example embodiment the property management system 115 may be located within the same computer or computer network as the utility notification system 105, and may be accessed via the internet through the use of a web-based GUI. Accordingly, in an example embodiment, the utility notification system 105 may reside on a computer or computer network and may be accessed via the internet through the use of a web-based GUI. According to an example embodiment, the property management system 115 may be in communication with the utility notification system 105 via a computer network, the internet, or via shared database.

According to example embodiments of the invention, the utility notification system 105 may be in communication with the one or more property management systems 115, one or more utility switching transaction data sources 120, one or more utility service providers 122, one or more property owners/managers 118, and one or more tenants 124 via one or more networks 125, which can include the Internet. It will be appreciated that other networks, including any combination of local area networks (LANs) and wide area networks (WANs), may also be used. It should also be appreciated that another embodiment of the present invention allows the utility notification system 105 to be incorporated in a PMS 115 in whole or part. It is also possible for the utility notification system to be incorporated into a system operated by one or more of the utility switching transaction data sources 120, or one or more utility service providers 122. In either case, the necessity of a network 125 to the utility notification system 105 might be altered or negated.

According to embodiments of the invention, switching transaction data 157 can be supplied by the utility service provider 122, another utility switching transaction data source 120, or it can be obtained from a utility service provider 122 without the utility service provider's 122 direct participation, such as by screen scrapping the a web-site that exposes data to the property owner/manger 118, or by any other means where the data may be obtained.

According to yet another aspect of the invention, the utility notification module 135 is accessible, via a network 125, to an entity associated with the at least one property management system 115. The utility notification module 135 can also be controlled, at least in part, by the entity associated with the at least one property management system 115, the utility service provider 122, or the property owner/manager 118. In addition, the notification module may provide alerts or marketing activities to the utility service provider 122 when a tenant 124 is identified by the service provider to be in violation, in potential violation, or not corresponding to a utility service account.

According to an example embodiment of the invention, an entity associated with the utility service provider 122, the property management system 115, or the property owner/manager 118 may configure the one or more alerts, including the timing, format, content, and recipient of the one or more alerts. Furthermore the utility notification module 135 can include one or more methods accessible by third party applications to facilitate the configuration of the one or more alerts.

According to yet another aspect of the invention, the one or more alerts or notifications can include an email alert, a letter, a report, a telephone call, an estimated utility bill or any other available means of communicating information. Furthermore, the estimated utility bill may be generated based on a flat daily consumption charge agreed upon between the tenant 124 and the property owner/manager 118. The flat daily utility bill charges may be uploaded to the property management system 115 by the provider of the system 100 or the utility service provider 122 via a network for tracking, collection and/or accounting purposes. The flat daily utility bill statements may also be prepared and electronically transmitted to the property management system 115 or the entity associated with the tenant data 156 for presentment to the tenant 124. In yet another aspect of the invention, the daily flat utility bill charges may be printed on a utility bill and mailed or e-mailed to the tenants 124 directly. The flat daily utility bill charges may be paid in person by the tenant 124 to the property owner/manager 118, the entity associated with the property management system 115, or any third party assigned to collect on behalf of the property owner/manager 118 at a specified time or when rents are due The flat daily utility bill charges may also be subtracted from the tenant's 124 security deposit. The flat daily utility bill statements may include flat daily charges, activation charges and other billing fees associated with the preparation of the estimated utility bills. The estimated utility bills may be different than typical utility bill statements generated by the utility service providers once a month that are based on actual meter reading and actual consumption by the tenants 124. The property management system 115 can also be property management system software.

According to one aspect of the invention, the one or more notifications or alerts are provided prior to a pending utility bill being printed, where the pending utility bill may be based on the actual meter reading consumption information, and where the pending utility bill may be associated with a period of time when the at least one tenant 124 is responsible for payment of the utility service. According to one embodiment of the invention, the pending utility bill may cover time periods associated with the use of utility service including current and past usage. According to another embodiment of the invention, the pending utility bill may cover time periods associated with the use of utility service including future usage.

Many modifications and other embodiments of the inventions set forth herein will come to mind to one skilled in the art to which these inventions pertain having the benefit of the teachings presented in the foregoing descriptions and the associated attachments. Therefore, it is to be understood that the inventions are not to be limited to the specific embodiments disclosed and that modifications and other embodiments are intended to be included within the scope of the present disclosure. Although specific terms are employed herein, they are used in a generic and descriptive sense only and not for purposes of limitation.

Accordingly, example embodiments of the invention can provide the technical effects of creating certain systems and methods that identify tenants 124 who may utilize, or have the potential to utilize utility service without paying for the service. Example embodiments of the invention can provide the further technical effects of providing systems and methods for alerting owners/managers 118, tenants 124, and/or the utility service provider 122 when a potential or actual violation occurs.

The invention is described above with reference to block and flow diagrams of systems, methods, apparatuses, and/or computer program products according to example embodiments of the invention. Some blocks of the block diagrams and flow diagrams may not necessarily need to be performed in the order presented, or may not necessarily need to be performed at all, according to some embodiments of the invention.

It will be understood that one or more blocks of the block diagrams and flow diagrams, and combinations of blocks in the block diagrams and flow diagrams, respectively, can be implemented by computer-executable program instructions. These computer-executable program instructions may be loaded onto a general purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

In certain embodiments, performing the specified functions, elements or steps can transform an article into another state or thing. For instance, example embodiments of the invention can provide certain systems and methods that transform a comparison of switching transaction data 157 and tenant data 156 to alerts. Example embodiments of the invention can further provide systems and methods for transforming switching transaction and tenant data 156 into daily fees or notices to disconnect.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

We claim:

1. A notification system to identify utility theft for an entity associated with a premise under a Continuous Service Agreement with at least one utility service provider, where utility service is never turned off such that the entity may legally use utility services while a premise is vacant, comprising:
    at least one memory for storing data and computer-executable instructions;
    at least one computer interface; and
    at least one processor in communication with the at least one computer interface and configured to access the at least one memory, and further configured to execute the computer-executable instructions to:
        receive tenant data from at least one property management system wherein the tenant data identifies at least one tenant responsible for utility service and includes at least one of a lease start date, an actual move-in date, or a lease renewal date and at least one of an expected move-out date, an actual move-out date, a lease expiration date, or a notice to vacate date for tenants occupying the premises of the entity;
        receive switching transaction data from one or more switching transaction data sources, wherein the switching transaction data comprises information identifying at least one of the establishment date or termination date of the utility service;
        compare the switching transaction data to at least one of the lease start date, the actual move-in date, the lease renewal date, the expected move-out date, the lease expiration date, the notice to vacate date, or the actual move-out date to identify the unauthorized use of utility services; and
        provide one or more notifications in response to the detection of unauthorized use of utility service.

2. The notification system of claim 1, wherein the at least one processor is further configured to execute the computer-executable instructions to receive at least one of the switching transaction data or tenant data from at least one network or shared database.

3. The notification system of claim 1, wherein the provider of the switching transaction data may comprise at least one utility service provider.

4. The notification system of claim 1, wherein the at least one processor is further configured to execute the computer-executable instructions to automatically provide the one or more notifications to at least one of an entity associated with the at least one property management system, an entity associated with the utility service provider, an entity associated with the system for identifying utility theft, or an entity associated with the premises.

5. The notification system of claim 1, wherein the comparison of the switching transaction data to the tenant data is performed in response to receiving at least one of the switching transaction data or the tenant data.

6. The notification system of claim 1, wherein the comparison of the switching transaction data to the tenant data is performed within one week of receiving at least one of the switching transaction data or the tenant data.

7. The notification system of claim 1, wherein the one or more notifications are provided prior to a pending utility bill being printed by a utility service provider for use of the utility service, where the pending bill is associated with a period of time when the at least one tenant is responsible for payment of the utility service.

8. The notification system of claim 1, wherein the one or more notifications include an indication to charge tenants one or more fees based on the identified unauthorized use of utility services associated with the premises.

9. The notification system of claim 8, wherein the one or more fees include an amount based at least in part on an estimated cost.

10. The notification system of claim 1, wherein the one or more notifications include one or more of an indication identifying a tenant associated with the tenant data, an indication of the dates of detected unauthorized use of utility service, an indication of a daily fee rate for unauthorized use of utility service associated with the premises, an estimated cost associated with the unauthorized use of utility service associated with the premises, an estimated cost of recovering utility costs associated with the unauthorized use of utility service associated with the premises, an indication of a total fee amount to be charged, or historical data associated with the tenant.

11. The notification system of claim 1, wherein the at least one processor is further configured to execute the computer-executable instructions to:
    setup at least one of a default notification delivery method, a default notification format, a default notification recipient, or default notification content;
    receive notification configuration instructions from at least one of an entity associated with the at least one property management system, an entity associated with the system for identifying utility theft, an entity associated with a utility provider, or an entity associated with a third party provider of utility switching transaction data; and
    update the at least one of a default notification delivery method, a default notification format, a default notification recipient, or default notification content.

12. The notification system of claim 1, wherein the at least one processor is further configured to execute the computer-executable instructions to automatically send a disconnect request or a notification to disconnect to the at least one entity associated with the utility service when unauthorized use of the utility service at a premises is detected.

13. The notification system of claim 1, wherein the at least one processor is further configured to execute the computer-executable instructions to provide one or more notifications using one or more of e-mail, Graphical User Interface, web services, instant messaging, SMS messaging, automated telephone notification, report, U.S. mail, delivery service, fax, or private courier.

14. A computer-implemented method for identifying utility theft for an entity associated with a premise under a Continuous Service Agreement with at least one utility service provider, where utility service is never turned off such that the entity may legally use utility services while a premise is vacant, the method comprising:

executing computer-executable instructions by one or more processors configured to execute the computer-executable instructions for:

receiving tenant data from at least one property management system, wherein the tenant data identifies at least one tenant responsible for utility service and includes at least one of a lease start date, an actual move-in date, or a lease renewal date and at least one of an expected move-out date, an actual move-out date, a lease expiration date, or a notice to vacate date for tenants occupying the premises of the entity;

receiving switching transaction data from one or more switching transaction data sources, wherein the switching transaction data comprises information identifying at least one of the establishment date or termination date of the utility service;

comparing the switching transaction data to at least one of the lease start date, the actual move-in date, the lease renewal date, the expected move-out date, the lease expiration date, the notice to vacate date, or the actual move-out date to identify the unauthorized use of utility services; and providing one or more notifications in response to the detection of unauthorized use of utility service.

15. The method of claim 14, wherein receiving at least one of the switching transaction data or the tenant data includes receiving at least one of the switching transaction data or tenant data from at least one network or shared database.

16. The method of claim 14, wherein the provider of the switching transaction data may comprise at least one utility service provider.

17. The method of claim 14, wherein the one or more processors are further configured to execute the computer-executable instructions for automatically providing the one or more notifications to at least one of an entity associated with the at least one property management system, an entity associated with the utility service provider, an entity associated with the system for identifying utility theft, or an entity associated with the premises.

18. The method of claim 14, wherein the comparing the tenant data to the switching transaction data is performed in response to receiving at least one of the switching transaction data or the tenant data.

19. The method of claim 14, wherein the comparing the tenant data to the switching transaction data is performed within one week of receiving at least one of the switching transaction data or the tenant data.

20. The method of claim 14, wherein the one or more notifications are provided prior to a pending utility bill being printed by a utility service provider for use of the utility service, where the pending bill is associated with a period of time when the at least one tenant is responsible for payment of the utility service.

21. The method of claim 14, wherein the one or more notifications include an indication to charge tenants one or more fees based on the identified unauthorized use of utility services associated with the premises.

22. The method of claim 21 wherein the one or more fees include an amount based at least in part on an estimated cost.

23. The method of claim 14, wherein the one or more notifications include one or more of an indication identifying a tenant associated with the tenant data, an indication of the dates of detected unauthorized use of utility service, an indication of a daily fee rate for unauthorized use of utility service associated with the premises, an estimated cost associated with the unauthorized use of utility service associated with the premises, an estimated cost of recovering utility costs associated with the unauthorized use of utility service associated with the premises, an indication of a total fee amount to be charged, or historical data associated with the tenant.

24. The method of claim 14, wherein the one or more processors are further configured to execute the computer-executable instructions for:

setting at least one of a default notification delivery method, a default notification format, a default notification recipient, or default notification content;

receiving notification configuration instructions from at least one of an entity associated with the at least one property management system, an entity associated with the system for identifying utility theft, an entity associated with a utility provider, or an entity associated with a third party provider of utility switching transaction data; and updating the at least one of a default notification delivery method, a default notification format, a default notification recipient, or default notification content.

25. The method of claim 14, wherein the one or more processors are further configured to execute the computer-executable instructions for automatically sending a disconnect request or a notification to disconnect to the at least one entity associated with the utility service when unauthorized use of the utility service at a premises is detected.

26. The method of claim 14, wherein the one or more processors are further configured to execute the computer-executable instructions for providing one or more notifications using one or more of e-mail, Graphical User Interface, web services, instant messaging, SMS messaging, automated telephone notification, report, U.S. mail, delivery service, fax, or private courier.

* * * * *